US011545656B2

(12) United States Patent
Park (10) Patent No.: US 11,545,656 B2
(45) Date of Patent: Jan. 3, 2023

(54) METHOD AND SYSTEM FOR BATTERY ELECTRODE LAMINATION USING OVERLAPPED IRREGULAR SHAPED ACTIVE MATERIAL AND ADHESIVE

(71) Applicant: Enevate Corporation, Irvine, CA (US)

(72) Inventor: Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 16/676,684

(22) Filed: Nov. 7, 2019

(65) Prior Publication Data
US 2021/0143390 A1 May 13, 2021

(51) Int. Cl.
| H01M 4/04 | (2006.01) |
| H01M 4/133 | (2010.01) |
| H01M 4/134 | (2010.01) |
| H01M 4/1393 | (2010.01) |
| H01M 4/1395 | (2010.01) |
| H01M 4/36 | (2006.01) |

(Continued)

(52) U.S. Cl.
CPC ......... H01M 4/0435 (2013.01); H01M 4/133 (2013.01); H01M 4/134 (2013.01); H01M 4/1393 (2013.01); H01M 4/1395 (2013.01); H01M 4/364 (2013.01); H01M 4/386 (2013.01); H01M 4/587 (2013.01); H01M 4/622 (2013.01); H01M 4/661 (2013.01); H01M 10/0525 (2013.01); H01M 2004/027 (2013.01)

(58) Field of Classification Search
None
See application file for complete search history.

(56) References Cited

U.S. PATENT DOCUMENTS

| 2002/0122975 A1* | 9/2002 | Spillman | H01M 4/13 429/128 |
| 2003/0054259 A1* | 3/2003 | Murai | H01M 10/0525 429/330 |

(Continued)

OTHER PUBLICATIONS

Dictionary entries for "adhesive" using Google Define feature and MacMillian Dictionary, accessed Nov. 30, 2020 (Year: 2020).*

(Continued)

*Primary Examiner* — Amanda J Barrow
(74) *Attorney, Agent, or Firm* — McAndrews, Held & Malloy, Ltd.

(57) ABSTRACT

Systems and methods for electrode lamination using overlapped irregular shaped active material may include a battery having a cathode, an electrolyte, and an anode, with the anode including an active material on a metal current collector. The active material may include a plurality of irregularly shaped pieces bonded to the metal current collector, and may include silicon, carbon, and a pyrolyzed polymer. The active material may include more than 50% silicon by weight. The plurality of irregularly shaped pieces may be roll press laminated to the metal current collector. Gaps may remain between some of the irregularly shaped pieces of active material. The gaps may absorb strain in the active material during lithiation of the anode. The metal current collector may include a copper or nickel foil. Portions of the metal current collector not covered by active material may be protected by an adhesive or inorganic layer.

19 Claims, 6 Drawing Sheets

(51) Int. Cl.
*H01M 4/38* (2006.01)
*H01M 4/587* (2010.01)
*H01M 4/62* (2006.01)
*H01M 4/66* (2006.01)
*H01M 10/0525* (2010.01)
*H01M 4/02* (2006.01)

(56) References Cited

U.S. PATENT DOCUMENTS

| | | | | |
|---|---|---|---|---|
| 2008/0113270 | A1* | 5/2008 | Hirose | H01M 4/0423 |
| | | | | 429/231.95 |
| 2008/0145757 | A1* | 6/2008 | Mah | H01M 4/387 |
| | | | | 429/219 |
| 2008/0213654 | A1* | 9/2008 | Fensore | H01M 4/12 |
| | | | | 429/163 |
| 2009/0068559 | A1* | 3/2009 | Gamoh | H01M 4/131 |
| | | | | 429/220 |
| 2009/0317726 | A1* | 12/2009 | Hirose | H01M 10/0568 |
| | | | | 429/330 |
| 2010/0124707 | A1* | 5/2010 | Hirose | H01M 4/1395 |
| | | | | 429/331 |
| 2011/0070479 | A1* | 3/2011 | Matsuda | H01M 10/0525 |
| | | | | 429/162 |
| 2011/0151326 | A1* | 6/2011 | Hirose | H01M 4/0421 |
| | | | | 429/218.1 |
| 2011/0294005 | A1* | 12/2011 | Kuriki | H01M 10/0525 |
| | | | | 429/209 |
| 2014/0166939 | A1* | 6/2014 | Park | H01M 4/0416 |
| | | | | 252/502 |
| 2014/0170475 | A1* | 6/2014 | Park | H01M 4/0435 |
| | | | | 429/188 |
| 2015/0044571 | A1* | 2/2015 | Abdelsalam | H01M 4/583 |
| | | | | 429/231.8 |
| 2016/0172665 | A1* | 6/2016 | Zhou | H01M 4/587 |
| | | | | 429/338 |
| 2017/0117528 | A1* | 4/2017 | Lee | H01M 10/0525 |
| 2018/0287164 | A1* | 10/2018 | Liu | C23C 18/1208 |
| 2019/0074506 | A1* | 3/2019 | Troegel | H01M 4/386 |
| 2019/0074508 | A1* | 3/2019 | Ha | H01M 4/133 |
| 2019/0097222 | A1* | 3/2019 | Feaver | H01M 10/0525 |
| 2019/0177171 | A1* | 6/2019 | Troegel | H01M 4/364 |
| 2019/0252684 | A1* | 8/2019 | Yang | H01M 4/134 |
| 2019/0267617 | A1* | 8/2019 | Evans | H01M 4/587 |
| 2019/0326636 | A1* | 10/2019 | Lee | H01M 10/0525 |
| 2019/0393488 | A1* | 12/2019 | Tzeng | H01M 4/587 |

OTHER PUBLICATIONS

Su et al., "Silicon, flake graphite and phenolic resin-pyrolyzed carbon based Si/C composites as anode material for lithium-ion batteries," Advanced Power Technology 24 (2013) 921-925, available online Feb. 9, 2013 (Year: 2013).*

* cited by examiner

METHOD AND SYSTEM FOR BATTERY ELECTRODE LAMINATION USING OVERLAPPED IRREGULAR SHAPED ACTIVE MATERIAL AND ADHESIVE

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for electrode lamination using overlapped irregular shaped active material.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for electrode lamination using overlapped irregular shaped active material, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
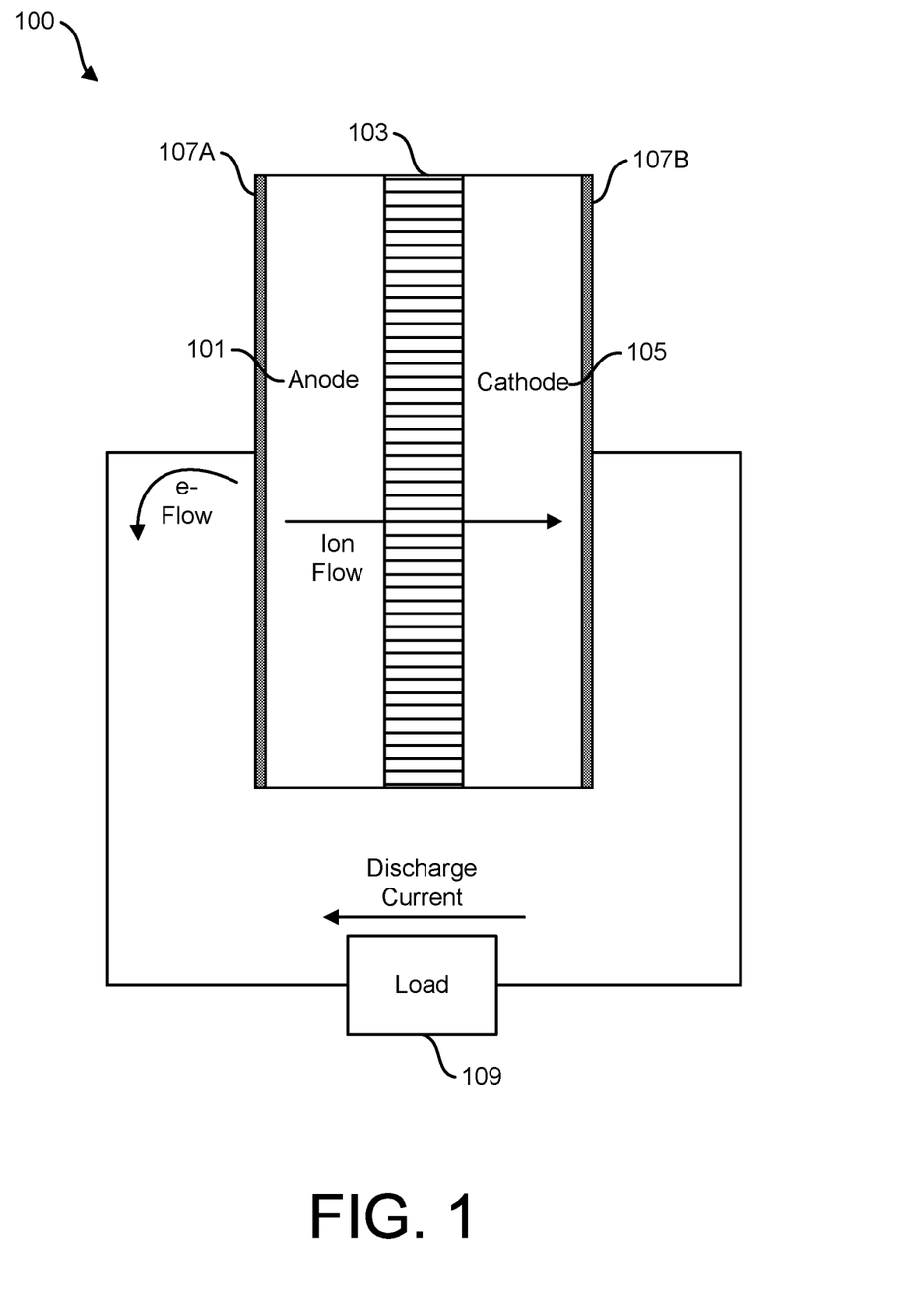
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an active material or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The pyrolysis process used in making anodes can lead to brittle material, which may result in irregular shapes upon handling. Overlapping anode active material when applying to the current collector does not adversely impact cell performance. Therefore, a mosaic of irregular shapes may be used in forming a full anode active material layer, as shown further with respect to FIGS. 2-6.

Figure 2:
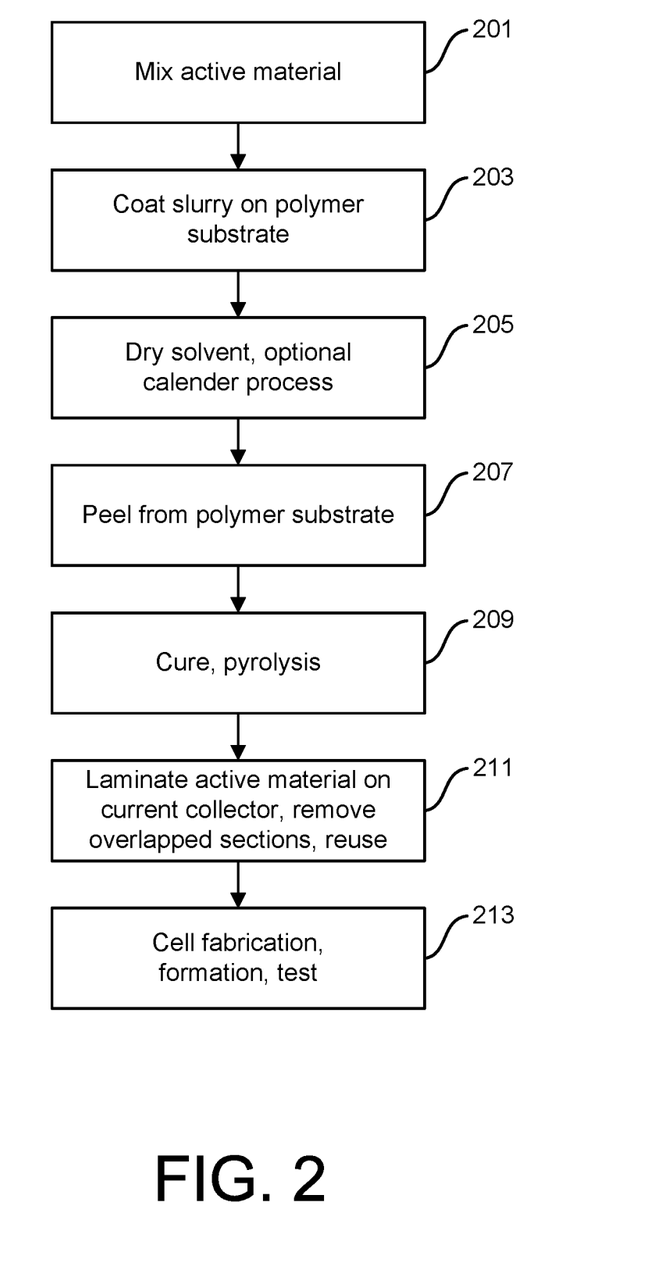
FIG. 2 is a flow diagram of a process for fabricating a cell, in accordance with an example embodiment of the disclosure.

FIG. 2 is a flow diagram of a process for fabricating a cell, in accordance with an example embodiment of the disclosure. This process represents a lamination process where the active material, conductive additive, and pyrolyzed carbon precursor (binder/resin) are mixed together and formed on a temporary substrate followed by peeling and lamination processes.

This process is shown in the flow diagram of FIG. 2, starting with step 201 where the active material may be mixed with a binder/resin such as polyimide (PI) or polyamide-imide (PAI), solvent, the silosilazane additive, and optionally a conductive carbon. Graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size and impurity level may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 20-40%. The particle size and mixing times may be varied to configure the active material density and/or roughness.

Furthermore, cathode active materials may be mixed in step 201, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 203, the slurry may be coated on a polymer substrate, such as polyethylede terephthalate (PET), polypropylene (PP), or Mylar. The slurry may be coated on the PET/PP/Mylar film at a loading of 3-4 mg/cm$^2$ (with 12-18% solvent content), and then dried to remove a portion of the solvent in step 205. An optional calendering process may be utilized where a series of hard pressure rollers may be used to finish the film/substrate into a smoothed and denser sheet of material.

In step 207, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 209 where the film may be cut into sheets, and vacuum dried using a two-stage process (100-140° C. for 14-16 hours, 200-240° C. for 4-6 hour). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 211, the pyrolyzed material may be flat press laminated on the current collector, where for an anode, a copper foil may be coated with polyamide-imide with a nominal loading of 0.3-0.6 mg/cm$^2$ (applied as a 5-7 wt % varnish in NMP, dried 14-18 hours at 100-120° C. under vacuum) while for a cathode, the active material may be laminated to an aluminum foil, for example. In one embodiment, the pyrolyzed silicon-carbon material may be roll-press laminated to the current collector, as illustrated with respect to FIG. 4. In another embodiment, the silicon-carbon composite film may be flat-press laminated to the coated foil using a heated hydraulic press (40-60 seconds, 250-350° C., and 3500-4500 psi). The active material may be in irregular shapes and placed on the current collector with overlapping areas so as to completely, or nearly completely, cover the surface of the current collector. When pressed, the overlapping sections may break off and then may be removed using air, fluid cleaning, or with mechanical cleaning such as with a brush or mechanical polishing, thereby forming the finished silicon-composite electrode. The broken off pieces may later be reused in another lamination process.

In step 213, the electrodes may then be sandwiched with a separator and electrolyte to form a cell. The cell may be subjected to a formation process, comprising initial charge and discharge steps to lithiate the anode, with some residual lithium remaining, and the cell performance may be assessed.

Figure 3:
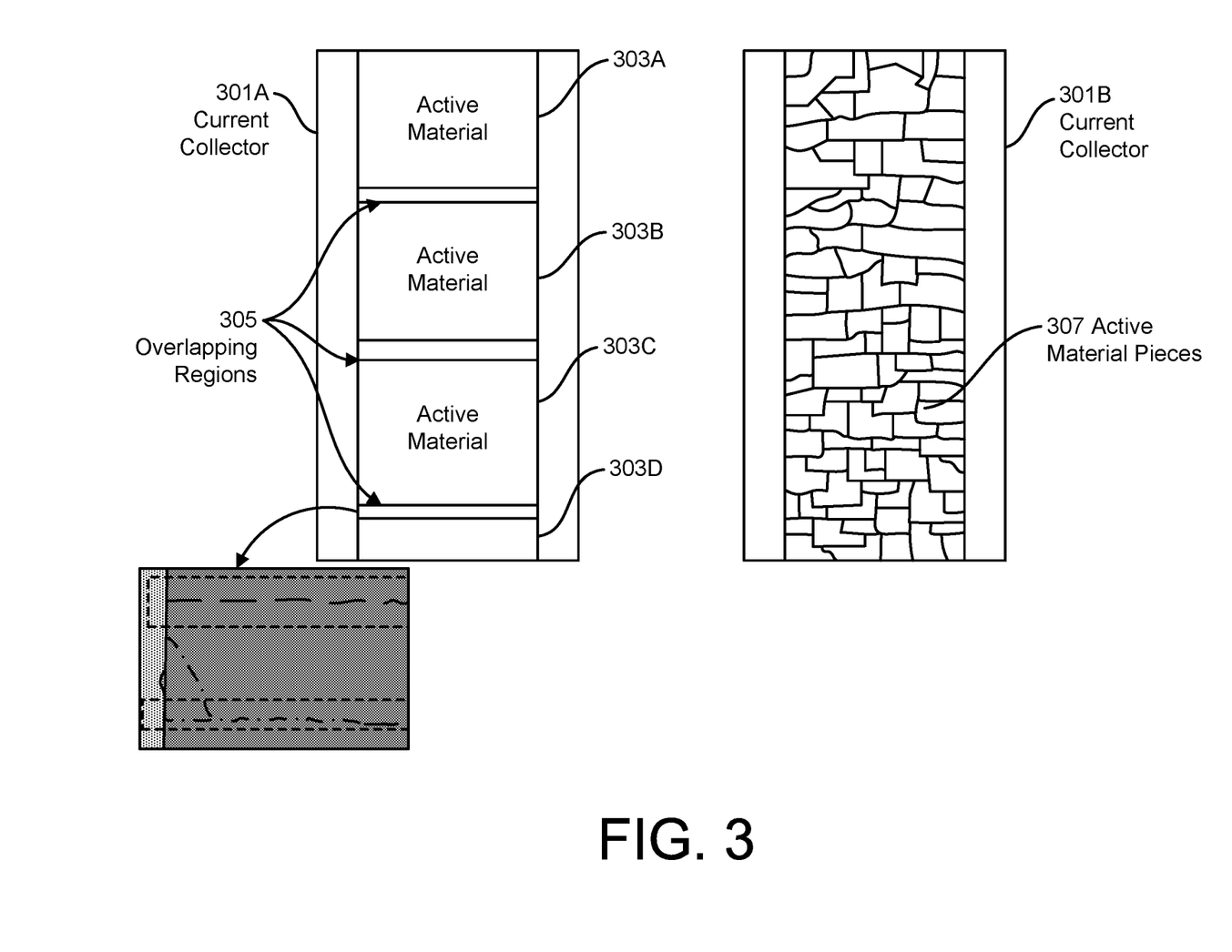
FIG. 3 illustrates anodes formed with overlapping sections of regular and irregular shapes of active material on a current collector, in accordance with an example embodiment of the disclosure.

FIG. 3 illustrates anodes formed with overlapping sections of regular and irregular shapes of active material on a current collector, in accordance with an example embodiment of the disclosure. Referring to FIG. 3, there is shown a current collector 301A with overlapping sections of active material 303A-303D. An adhesive layer, not shown, may extend the length of the current collector 301A leaving the outer edges exposed for welding purposes, for example. The inset to the lower left shows the overlapping sections 305.

Similarly, FIG. 3 also illustrates a current collector 301B with irregularly shaped active material pieces 307 placed on the surface. To achieve complete, or nearly complete, coverage of the region of the current collector with adhesive, a large number of active material pieces 307 may be spread over the current collector 301B with overlap of pieces. A roll-press process, as shown with respect to FIG. 4, may be utilized to press the overlapping pieces such that overlapping sections break off while the remaining portions cover the surface of the current collector. Due to the protective nature of the adhesive layer, or other protective layers on the current collector such as an inorganic layer, e.g., an oxide, and the over-capacity of the anode with respect to the cathode, it is not necessary to have 100% coverage of the current collector 301B. Any gaps in the active material do not adversely affect performance, and may actually help absorb or alleviate strain due to expansion during lithiation.

Furthermore, the overlapping pieces that break off in the lamination process may be reused in a subsequent lamination. This use of overlapping irregularly shaped active material pieces can greatly improve processing times, as it does not require accurate placement of active material to the current collector and also reduces cost due to reduced waste.

Figure 4:
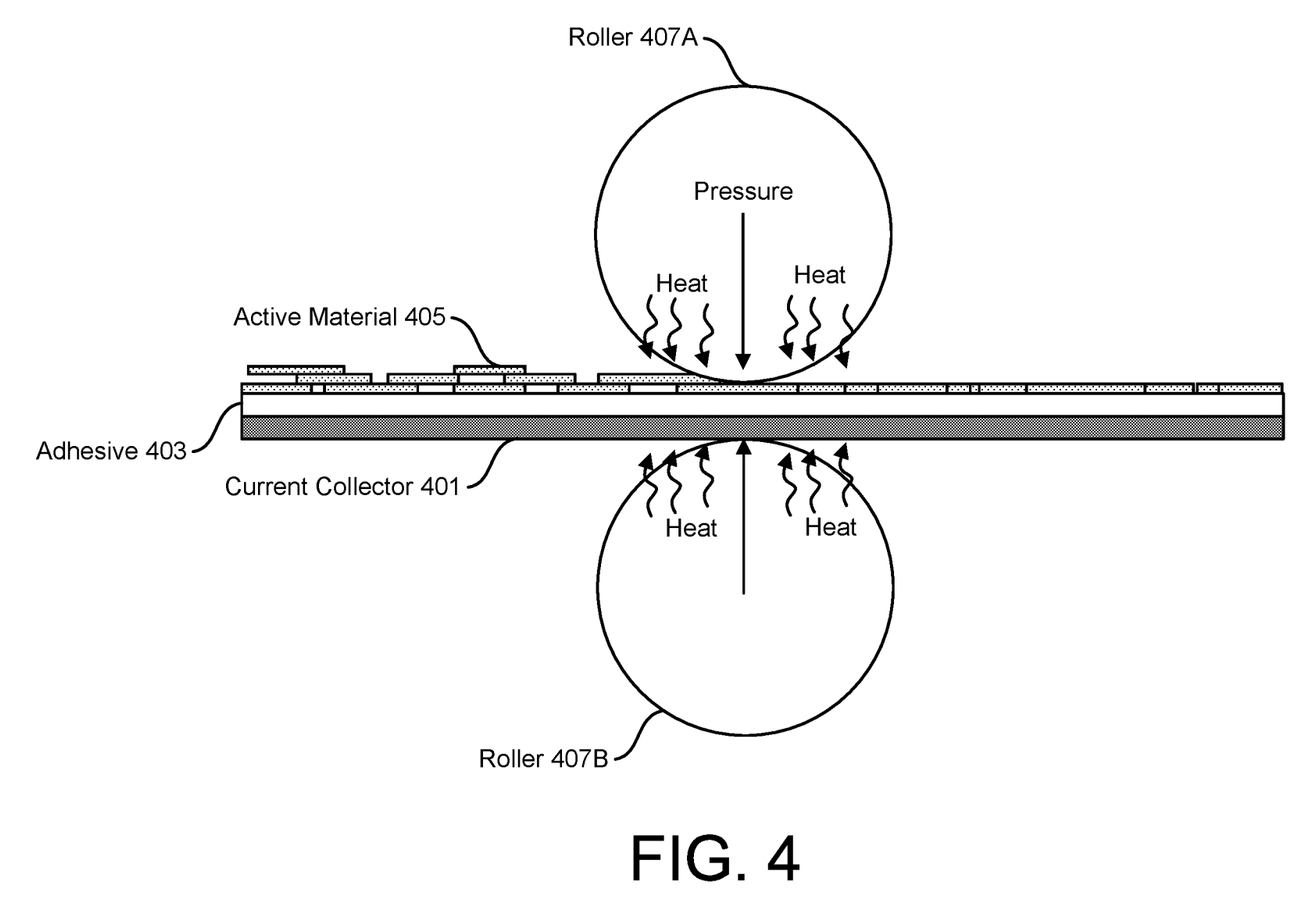
FIG. 4 illustrates a roll-press lamination process for overlapping irregularly shaped active material pieces on a current collector, in accordance with an example embodiment of the disclosure.

FIG. 4 illustrates a roll-press lamination process for overlapping irregularly shaped active material pieces on a current collector, in accordance with an example embodiment of the disclosure. Referring to FIG. 4, there is shown a roll press lamination process comprising a current collector 401, active material 405, and rollers 407A and 407B. The current collector 401 may comprise a metal foil, such as copper or nickel, as set forth above. The rollers 407A and 407B may comprise semi-rigid cylindrical structures for applying a configurable pressure to material passed between them in a lamination process. The rollers used to attach the material can have a flexible deformable surface for lamination since the surface won't be flat due to the irregularly shaped active material 405. The deformable surface may comprise a softer material, such as a rubber compound, on the outer surface of a steel cylinder, to allow for thickness variation of the active material 405, as the active material 405 may comprise overlapping irregularly shaped pieces spread over the surface of the current collector 401. It should be noted that while FIG. 4 shows active material on one side, the disclosure is not so limited, as the roll press process applies to double-sided foils too.

Heat may be applied to the materials being laminated using heating elements in the rollers 407A and 407B, or from external heat sources. The roll press lamination process thus has variables of pressure, temperature, and roller rigidity. In addition, the amount of solvent before, during, and after lamination impacts the expansion of the layer, which may be tied to the temperature employed during lamination. A higher amount of residual solvent may remain before and during lamination for roll press.

Figure 5:
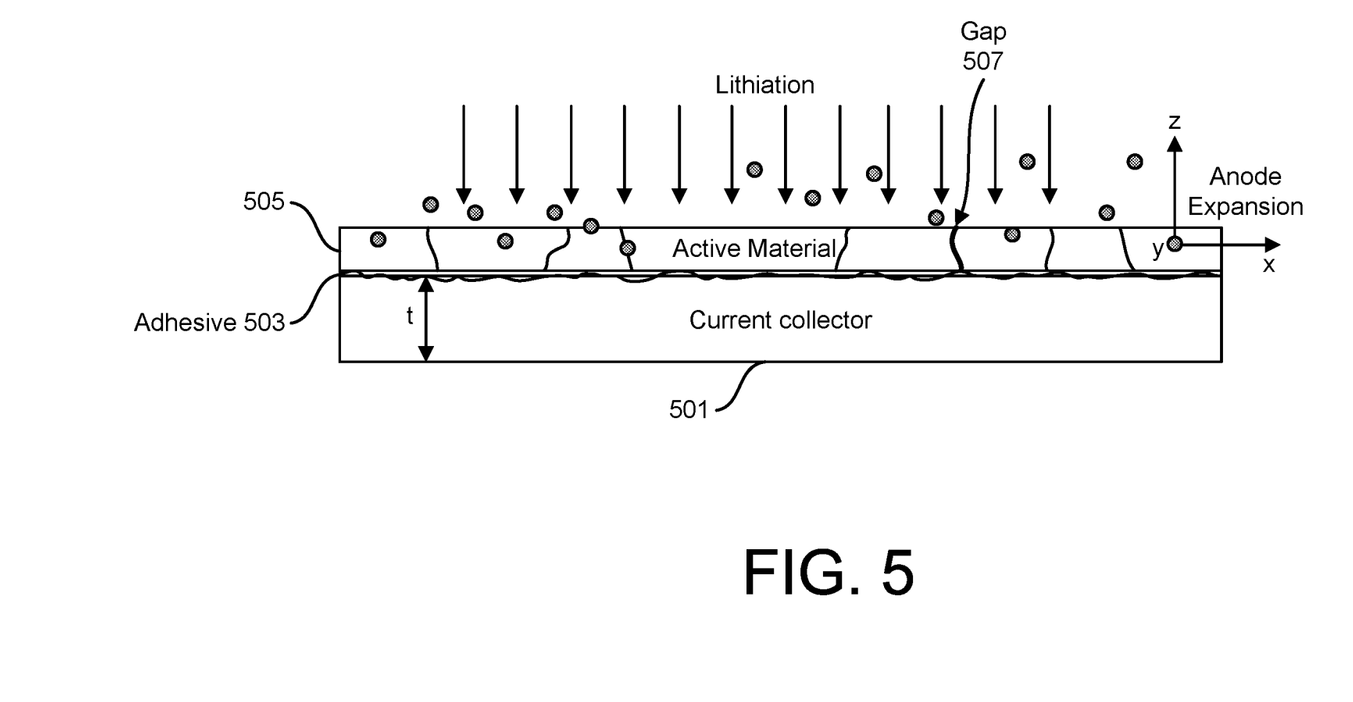
FIG. 5 illustrates an anode during lithiation, in accordance with an example embodiment of the disclosure.

FIG. 5 illustrates an anode during lithiation, in accordance with an example embodiment of the disclosure. Referring to FIG. 5, there are shown a current collector 501, adhesive 503, and an active material 505. The layer thicknesses are not necessarily shown to scale, and the adhesive 503 is typically thin enough such that the active material 505 makes contact with the current collector 501 in various locations on the surface. In an example scenario, the anode active material 505 comprises silicon particles in a binder material and a solvent, where the active material is pyrolyzed to turn the binder into a pyrolyzed carbon that provides a structural framework around the silicon particles and also provides electrical conductivity. The active material may be coupled to the current collector 501 using the adhesive 503 and may be placed on the current collector 501 before lamination using overlapping irregularly shaped pieces, as set forth above. The resulting active material 505 thus comprises multiple regions of active materials with interfaces between the pieces, as indicated by the sections in the active material 505. These interfaces do not adversely impact the performance of the cell, due to the over-capacity of the anode with respect to the cathode and the protective layer of adhesive on the current collector 501. In fact, at interfaces where a gap is present, such as gap 507, it may actually help alleviate strain due to expansion during lithiation. The portions of the current collector 501 not covered by the active material 505 may be protected by the adhesive 503 and/or an inorganic layer in or adjacent to the adhesive. The current collector 501 may comprise a metal film, such as copper, nickel, or titanium, for example, although other conductive foils may be utilized depending on desired tensile strength.

FIG. 5 also illustrates lithium ions impinging upon and lithiating the active material 505 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 501 has a thickness t, where a thicker foil provides greater strength and providing the adhesive 503 is strong enough, restricts expansion in the x- and y-directions, resulting in greater z-direction expansion, thus anisotropic expansion. Example thicker foils may be greater than 10µm thick, such as 20µm for copper, for example, while thinner foils may be less than 10µm, such as 5-6µm thick for copper.

In an example scenario, the adhesive 503 comprises a polymer such as polyimide (PI) or polyamide-imide (PAI) that provides adhesive strength of the active material film 505 to the current collector 201 while still allowing electrical contact to the current collector 501. Other adhesives may be utilized depending on the desired strength, as long as they can provide adhesive strength with sufficient conductivity following processing. If the adhesive 503 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion. Furthermore, the adhesive 503 may provide protection of the metal surface in any interfaces where a gap may exist between sections of the active material 505.

Figure 6:
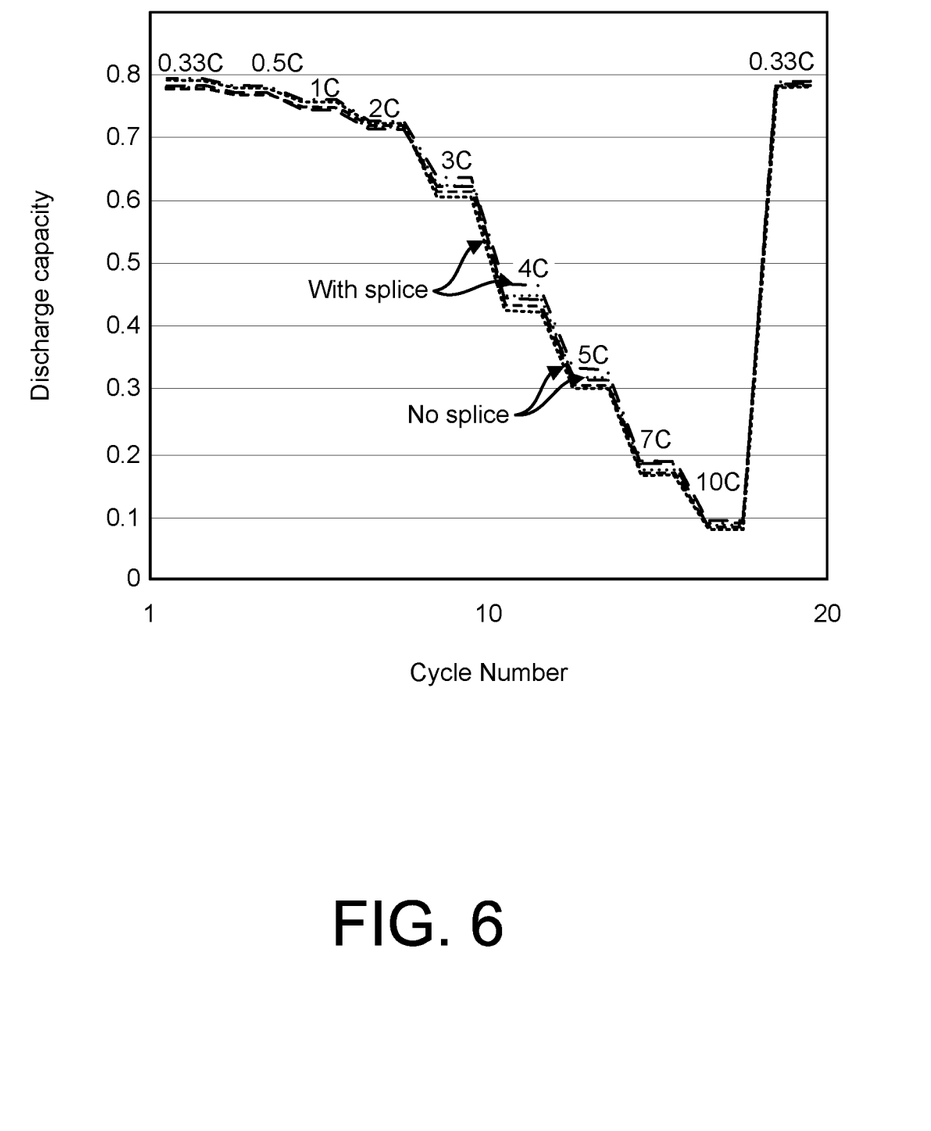
FIG. 6 illustrates cell performance for cells fabricated with anodes with and without overlapping sections of active material during lamination, in accordance with an example embodiment of the disclosure.

FIG. 6 illustrates cell performance for cells fabricated with anodes with and without overlapping sections of active material during lamination, in accordance with an example embodiment of the disclosure. Referring to FIG. 6, there is shown cell discharge capacity versus cycles at various discharge rates. As can be seen by the nearly co-linear plots, the performance is not affected by having active material interfaces from having overlapping regions (with splice) versus no overlap (no splice) during lamination.

In an example embodiment of the disclosure, a method and system are described for electrode lamination using overlapped irregular shaped active material. The battery may comprise a cathode, an electrolyte, and an anode, with the anode comprising active material on a metal current collector. The active material may comprise a plurality of irregularly shaped pieces bonded to the metal current collector. The active material may comprise silicon, carbon, and a pyrolyzed polymer on the metal current collector. The active material may comprise more than 50% silicon by weight. The plurality of irregularly shaped pieces may be roll press laminated to the metal current collector. Gaps may remain between some of the irregularly shaped pieces of active material. The gaps may absorb strain in the active material during lithiation of the anode. The metal current collector may comprise a copper or nickel foil in electrical contact with the active material. Portions of the metal current collector not covered by active material may be protected by an adhesive or inorganic layer. The electrolyte may comprise a liquid, solid, or gel. The battery may comprise a lithium ion battery.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A battery comprising:
   a cathode, an electrolyte, and an anode,
   the anode comprising an active material layer on a metal current collector,
   the active material layer consisting of a plurality of irregularly shaped pieces comprising silicon and pyrolyzed polymer,
   wherein the plurality of irregularly shaped pieces are coupled to the metal current collector by a polymer adhesive, wherein the plurality of irregularly shaped pieces cover a surface of the current collector with less than 100% coverage of the surface of the current collector by the plurality of irregularly shaped pieces.

2. The battery according to claim 1, wherein the active material layer comprises more than 50% silicon by weight.

3. The battery according to claim 1, wherein the plurality of irregularly shaped pieces are roll press laminated to the metal current collector.

4. The battery according to claim 1, wherein gaps remain between some of the plurality of irregularly shaped pieces.

5. The battery according to claim 4, wherein the gaps absorb strain in the active material layer during lithiation of the anode.

6. The battery according to claim 1, wherein the metal current collector comprises a copper or nickel foil in electrical contact with the active material layer.

7. The battery according to claim 1, wherein portions of the metal current collector not covered by the active material layer are protected by the polymer adhesive or an inorganic layer.

8. The battery according to claim 1, wherein the electrolyte comprises a liquid, solid, or gel.

9. The battery according to claim 1, wherein the battery comprises a lithium ion battery.

10. The battery according to claim 1, wherein a portion of the active material layer is in direct contact with the metal current collector.

11. A method of forming a battery, the method comprising:
fabricating a battery comprising a cathode, an electrolyte, and an anode, the anode comprising an active material layer on a metal current collector,
wherein the active material layer consists of a plurality of irregularly shaped pieces comprising silicon and pyrolyzed polymer,
wherein the plurality of irregularly shaped pieces are coupled to the metal current collector using a polymer adhesive, and
wherein the plurality of irregularly shaped pieces cover a surface of the current collector with less than 100% coverage of the surface of the current collector by the plurality of irregularly shaped pieces.

12. The method according to claim 11, wherein the active material layer comprises more than 50% silicon by weight.

13. The method according to claim 11, comprising roll press laminating the plurality of irregularly shaped pieces to the metal current collector.

14. The method according to claim 11, wherein gaps remain between some of the plurality of irregularly shaped pieces of active material layer.

15. The method according to claim 14, wherein the gaps absorb strain in the active material layer during lithiation of the anode.

16. The method according to claim 11, wherein the metal current collector comprises a copper or nickel foil in electrical contact with the active material layer.

17. The method according to claim 11, wherein portions of the metal current collector not covered by the active material layer are protected by the polymer adhesive or an inorganic layer.

18. The method according to claim 11, wherein the battery comprises a lithium ion battery and the electrolyte comprises a liquid, solid, or gel.

19. The method according to claim 11, wherein a portion of the active material layer is in direct contact with the metal current collector.

* * * * *